United States Patent [19]

Hayashi

[11] Patent Number: 4,486,573

[45] Date of Patent: Dec. 4, 1984

[54] CARBOXYLIC ACYLATING AGENTS SUBSTITUTED WITH OLEFIN POLYMERS OF HIGH MOLECULAR WEIGHT MONO-OLEFINS, DERIVATIVES THEREOF, AND FUELS AND LUBRICANTS CONTAINING SAME

[75] Inventor: Katsumi Hayashi, Mentor, Ohio

[73] Assignee: The Lubrizol Corporation, Wickliffe, Ohio

[21] Appl. No.: 404,846

[22] Filed: Aug. 9, 1982

[51] Int. Cl.$^3$ .................. C08F 255/08; C08F 255/10
[52] U.S. Cl. ........................................ 525/285; 44/62; 252/51.5 A; 252/56 R; 525/301; 525/309; 525/320; 525/333.7; 525/379; 525/384
[58] Field of Search ............... 525/301, 309, 320, 71, 525/78, 80, 74, 285

[56] References Cited

U.S. PATENT DOCUMENTS

| | | | |
|---|---|---|---|
| 2,588,412 | 3/1952 | Rocchini | 252/51.5 |
| 2,858,329 | 10/1958 | Brazten et al. | 260/48.5 |
| 2,892,786 | 6/1959 | Stuart et al. | 252/51.5 |
| 3,024,195 | 3/1962 | Drummond et al. | 252/51.5 |
| 3,087,936 | 4/1963 | Le Suer | 260/326.3 |
| 3,172,892 | 3/1965 | Le Suer et al. | 260/326.3 |
| 3,184,474 | 5/1965 | Catto et al. | 260/326.3 |
| 3,194,812 | 7/1965 | Norman et al. | 260/326.5 |
| 3,200,076 | 8/1965 | Anderson et al. | 252/51.5 |
| 3,202,678 | 8/1965 | Stuart et al. | 260/326.5 |
| 3,210,283 | 10/1965 | Stuart et al. | 252/51.5 |
| 3,214,460 | 10/1965 | McGee et al. | 260/48.2 |
| 3,216,936 | 11/1965 | Le Suer | 252/32.7 |
| 3,219,666 | 11/1965 | Norman et al. | |
| 3,220,949 | 11/1965 | Bell et al. | 252/51.5 |
| 3,235,503 | 2/1966 | de Vries | 252/51.5 |
| 3,252,908 | 5/1966 | Coleman | 252/31 |
| 3,255,108 | 6/1966 | Wiese | 252/32.7 |
| 3,269,946 | 8/1966 | Wiese | 252/32.5 |
| 3,272,746 | 9/1966 | Le Suer et al. | 252/47.5 |
| 3,274,113 | 9/1966 | Reiland | 252/78 |
| 3,288,577 | 11/1966 | Patinkin et al. | 44/62 |
| 3,306,908 | 2/1967 | Le Suer | 260/326.3 |
| 3,311,558 | 3/1967 | Pricer et al. | 252/47.5 |
| 3,311,561 | 3/1967 | Anderson et al. | 252/75 |
| 3,312,619 | 4/1967 | Vineyard | 252/47.5 |
| 3,324,033 | 6/1967 | Knapp | 252/51.5 |
| 3,341,542 | 9/1967 | Le Suer et al. | 260/268 |
| 3,364,001 | 1/1968 | Drummond et al. | 44/71 |
| 3,367,943 | 2/1968 | Miller et al. | 260/326.3 |
| 3,379,515 | 4/1968 | Lindstrom | 44/62 |
| 3,381,022 | 4/1968 | Le Suer | 260/404.8 |
| 3,389,087 | 12/1965 | Kresge et al. | 252/59 |
| 3,399,141 | 8/1968 | Clemens | 252/47.5 |
| 3,401,118 | 9/1968 | Benoit | 252/51.5 |
| 3,413,104 | 11/1968 | Mehmedbasich | 44/62 |
| 3,427,245 | 2/1969 | Hatten | 252/34.7 |
| 3,438,899 | 4/1969 | Benoit | 252/51.5 |
| 3,444,082 | 5/1969 | Kautsky | 252/51.5 |
| 3,448,049 | 6/1969 | Preuss et al. | 252/51.5 |
| 3,450,715 | 6/1969 | Lindstrom et al. | 260/326.3 |
| 3,451,933 | 6/1969 | Leister | 252/51.5 |
| 3,452,002 | 6/1969 | Brasch | 260/239.3 |
| 3,454,496 | 7/1969 | Schlobohm et al. | 252/32.7 |
| 4,033,889 | 7/1977 | Kiovsky | 525/301 |
| 4,146,590 | 3/1979 | Yamamoto et al. | 525/168 |
| 4,219,432 | 8/1980 | Girgenti et al. | 525/301 |
| 4,334,038 | 6/1982 | Beck et al. | 525/207 |
| 4,382,128 | 5/1983 | Li | 525/301 |

*Primary Examiner*—Wilbert J. Briggs, Sr.
*Attorney, Agent, or Firm*—Raymond F. Keller; Denis A. Polyn; Walter C. Danison, Jr.

[57] ABSTRACT

Hydrocarbyl substituted carboxylic acylating agents are made by reacting, optionally in the presence of chlorine or bromine, (A) one or more alpha-beta olefinically unsaturated carboxylic acid reagents containing 2 to about 20 carbon atoms, exclusive of the carboxyl-based groups with (B) one or more high molecular weight olefin polymers of more than 30 carbon atoms selected from the group consisting of
(i) polymers of $C_{12}$–$C_{30}$ mono-olefins, and
(ii) chlorinated or brominated analogs of (i).

This invention includes the acylated amine and/or alcohol derivatives of these hydrocarbyl-substituted carboxylic acid acylating agents, and the use of such derivatives and agents in lubricants and normally liquid fuels.

49 Claims, No Drawings

CARBOXYLIC ACYLATING AGENTS SUBSTITUTED WITH OLEFIN POLYMERS OF HIGH MOLECULAR WEIGHT MONO-OLEFINS, DERIVATIVES THEREOF, AND FUELS AND LUBRICANTS CONTAINING SAME

FIELD OF THE INVENTION

This invention relates to olefin polymer substituted carboxylic acylating agents, and to derivatives thereof. This invention also relates to concentrates, and lubricant and normally liquid fuel compositions containing such agents and derivatives, and to processes for preparing such agents and derivatives.

BACKGROUND OF THE INVENTION

Hydrocarbyl-substituted carboxylic acylating agents having at least 30 aliphatic carbon atoms in the substituent are known. The use of such carboxylic acylating agents as additives in normally liquid fuels and lubricants is discussed in U.S. Pat. Nos. 3,288,714 and 3,346,354. These acylating agents are also useful as intermediates for preparing additives for use in normally liquid fuels and lubricants as described in U.S. Pat. Nos. 2,892,786; 3,087,936; 3,163,603; 3,172,892; 3,189,544; 3,215,707; 3,219,666; 3,231,587; 3,235,503; 3,272,746; 3,306,907; 3,306,908; 3,331,776; 3,341,542; 3,346,354; 3,374,174; 3,379,515; 3,381,022; 3,413,104; 3,450,715; 3,454,607; 3,455,728; 3,476,686; 3,513,095; 3,523,768; 3,630,904; 3,632,511; 3,697,428; 3,755,169; 3,804,763; 3,836,470; 3,862,981; 3,936,480; 3,948,909; 3,950,341 and French Pat. No. 2,223,415.

The preparation of such substituted carboxylic acid acylating agents is known. Typically, such acylating agents are prepared by reacting one or more olefin polymers which contain an average of, for example, from about 30 to about 300 aliphatic carbon atoms, with one or more unsaturated carboxylic acid acylating agents.

The use of chlorine in the preparation of such acylating agents has been suggested as a means for improving the conversion of the reaction of olefin polymers and unsaturated carboxylic acid acylating agents. Methods for preparing substituted carboxylic acid acylating agents by this method are disclosed in U.S. Pat. Nos. 3,215,707; 3,219,666; 3,231,587; 3,787,374 and 3,912,764.

It would be advantageous to provide a hydrocarbyl substituted carboxylic acylating agent that could provide improved additive properties for lubricant and normally liquid fuel compositions. It would be advantageous if such an acylating agent could also be useful as an intermediate for producing improved additives for use in such lubricants and normally liquid fuels.

SUMMARY OF THE INVENTION

Hydrocarbyl substituted carboxylic acylating agents are provided in accordance with the present invention which are useful in providing improved additive properties for lubricants and normally liquid fuels. These acylating agents are also useful as intermediates for producing improved lubricant and normally liquid fuel additives such as detergents/dispersants and low temperature viscosity improvers.

Broadly stated, the present invention contemplates the provision of a hydrocarbyl-substituted carboxylic acylating agent made by reacting (A) one or more alpha-beta olefinically unsaturated carboxylic reagents containing two to about 20 carbon atoms exclusive of the carboxyl-based groups with (B) one or more olefin polymers of at least 30 carbon atoms selected from the group consisting of
(i) polymers of $C_{12}$–$C_{30}$ mono-olefins, and
(ii) chlorinated or brominated analogs of (i).
The reaction between components (A) and (B) can optionally be conducted in the presence of chlorine or bromine. The present invention further provides for compositions made by reacting the acylating agents of the present invention with one or more amines, one or more alcohols, or mixtures of said one or more amines and/or one or more alcohols. The present invention also provides for concentrates containing such acylating agents or compositions, and lubricant and normally liquid fuel compositions containing such acylating agents or compositions.

DESCRIPTION OF THE PREFERRED EMBODIMENTS

The term "hydrocarbyl" (and cognate terms such as hydrocarbyloxy, hydrocarbylmercapto, etc.) is used herein to include substantially hydrocarbyl groups (for example, substantially hydrocarbyloxy, substantially hydrocarbylmercapto, etc.), as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein. For example, in the context of this invention, a purely hydrocarbyl $C_{40}$ alkyl group and a $C_{40}$ alkyl group substituted with a methoxy substituent are substantially similar in their properties with regard to their use in this invention and would be hydrocarbyl.

Non-limiting examples of substituents which do not significantly alter the hydrocarbyl characteristics or properties of the general nature of the hydrocarbyl groups of this invention are the following:

Ether groups (especially hydrocarbyloxy such as phenoxy, benzyloxy, methoxy, n-butoxy, etc., and particularly alkoxy groups of up to ten carbon atoms)

Oxo groups (e.g., —O— linkages in the main carbon chain)

Nitro groups

Thioether groups (especially $C_{1-10}$ alkyl thioether)

Thia groups (e.g., —S— linkages in the main carbon chain)

Carbohydrocarbyloxy groups (e.g.,

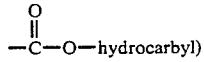

Sulfonyl groups (e.g.,

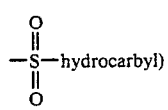

Sulfinyl groups (e.g.,

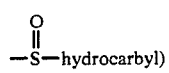

This list is intended to be merely illustrative and not exhaustive, and the omission of a certain class of substituent is not meant to require its exclusion. In general, if such substituents are present, there will not be more than two for each ten carbon atoms in the substantially hydrocarbyl groups and preferably not more than one for each ten carbon atoms since this number of substituents usually will not substantially affect the hydrocarbyl characteristics and properties of the group. Nevertheless, the hydrocarbyl groups usually will be free from non-hydrocarbon groups due to economic considerations; that is, they will be purely hydrocarbyl groups consisting of only carbon and hydrogen atoms.

The term "lower" as used in the present specification and claims, when used in conjunction with terms such as alkyl, alkenyl, alkoxy, and the like, is intended to describe such radicals which contain a total of up to seven carbon atoms.

The Hydrocarbyl-Substituted Carboxylic Acylating Agents

The hydrocarbyl-substituted carboxylic acylating agents of the present invention are olefin polymer substituted carboxylic acid acylating agents made by reacting (A) one or more alpha-beta olefinically unsaturated carboxylic acid reagents containing two to about 20 carbon atoms, exclusive of the carboxyl-based groups, with (B) one or more olefin polymers containing at least 30 carbon atoms.

The alpha-beta olefinically unsaturated carboxylic acid reagents (A) may be either the acid per se or functional derivatives thereof, e.g., anhydrides, esters, acylated nitrogen, acyl halide, nitriles, metal salts. These carboxylic acid reagents may be either monobasic or polybasic in nature. When they are polybasic they are preferably dicarboxylic acids, although tri- and tetracarboxylic acids can be used. Exemplary of the monobasic alpha-beta olefinically unsaturated carboxylic acid reagents are the carboxylic acids corresponding to the formula:

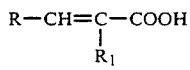

wherein R is hydrogen, or a saturated aliphatic or alicyclic, aryl, alkylaryl or heterocyclic group, preferably hydrogen or a lower alkyl group, and $R_1$ is hydrogen or a lower alkyl group. The total number of carbon atoms in R and $R_1$ should not exceed 18 carbon atoms. Specific examples of useful monobasic alpha-beta olefinically unsaturated carboxylic acids are acrylic acid, methacrylic acid, cinnamic acid, crotonic acid, 3-phenyl propenoic acid, alpha,beta-decenoic acid, etc. Exemplary polybasic acids include maleic acid, fumaric acid, mesaconic acid, itaconic acid and citraconic acid.

The alpha-beta olefinically unsaturated reagents (A) can also be functional derivatives of the foregoing acids. These functional derivatives include the anhydrides, esters, acylated nitrogen, acid halides, nitriles and metal salts of the afore-described acids. A preferred alpha-beta olefinically unsaturated carboxylic acid reagent (A) is maleic anhydride. Methods of preparing such functional derivatives are well known to those of ordinary skill in the art and they can be satisfactorily described by noting the reactants used to produce them. Thus, for example, derivative esters for use in the present invention can be made by esterifying monohydric or polyhydric alcohols or epoxides with any of the afore-described acids. Amines and alcohols described hereinafter can be used to prepare these functional derivatives. The nitrile functional derivatives of the afore-described carboxylic acid useful in making the products of the present invention can be made by the conversion of a carboxylic acid to the corresponding nitrile by dehydration of the corresponding amide. The preparation of the latter is well known to those skilled in the art and is described in detail in *The Chemistry of the Cyano Group* edited by Zvi Rappoport, Chapter 2, which is hereby incorporated by reference for its relevant disclosures pertaining to methods for preparing nitriles.

Ammonium salt acylated nitrogen functional derivatives can also be made from any of the amines described hereinafter as well as from tertiary amino analogs of them (i.e., analogs wherein the —NH groups have been replaced with —N-hydrocarbyl or —N-hydroxy hydrocarbyl groups), ammonia or ammonium compounds (e.g., $NH_4Cl$, $NH_4OH$, etc) by conventional techniques well known to those of ordinary skill in the art.

The metal salt functional derivatives of the foregoing carboxylic acid reagents (A) can also be made by conventional techniques well known to those of ordinary skill in the art. Preferably they are made from a metal, mixture of metals, or a basically reacting metal derivative such as a metal salt or mixture of metal salts where the metal is chosen from Group Ia, Ib, IIa or IIb of the periodic table although metals from Groups IVa, IVb, Va, Vb, VIa, VIb, VIIb and VIII can also be used. The gegen ion (i.e., counter) of the metal salt can be inorganic such as halide, sulfide, oxide, carbonate, hydroxide, nitrate, sulfate, thiosulfate, phosphite, phosphate, etc., or organic such as lower alkanoic, sulfonate, alcoholate, etc. The salts formed from these metals and the acid products can be "acidic," "normal" or "basic" salts. An "acidic" salt is one in which the equivalents of acid exceed the stoichiometric amounts required to neutralize the number of equivalents of metal. A "normal" salt is one wherein the metal and acid are present in stoichiometrically equivalent amounts. A "basic" salt (sometimes referred to as "overbased," "superbased" or "hyperbased" salts) is one wherein the metal is present in a stoichiometric excess relative to the number of stoichiometric equivalents of carboxylic acid compounds from which it is produced. The production of the latter are well known to those of ordinary skill in the art and are described in detail in "Lubricant Additives" by M. W. Ranney, pages 67–77, which is hereby incorporated by reference for its relevant disclosures pertaining to methods for preparing overbased salts.

The acid halide functional derivative of the afore-described olefinic carboxylic acids (A) can be prepared by the reaction of the acids and their anhydrides with a halogenation agent such as phosphorus tribromide, phosphorus pentachloride, or thionyl chloride. Esters can be prepared by the reaction of the acid halide with the aforesaid alcohols or phenolic compounds such as phenol, naphthol, octyl phenol, etc. Also, amides and imides and other acylated nitrogen derivatives can be prepared by reacting the acid halide with the above-described amino compounds. These esters and acylated nitrogen derivatives can be prepared from the acid halides by conventional techniques well known to those of ordinary skill in the art.

The olefin polymers (B) are selected from the group consisting of (i) polymers of $C_{12}$–$C_{30}$ mono-olefins, and
(ii) chlorinated or brominated analogs of (i).

These olefin polymers are preferably homopolymers and/or interpolymers of $C_{12}$–$C_{30}$ mono-olefins and are aliphatic in nature. The description of these olefin polymers as being aliphatic is intended to denote that, of the total number of carbon atoms in the polymer, no more than about 20% are non-aliphatic carbon atoms; that is, carbon atoms which are part of an alicyclic or aromatic ring. Thus, a polymer containing, e.g., 5% of its carbon atoms in alicyclic ring structures and 95% of its carbon atom in aliphatic structures would be an aliphatic polymer within the context of this invention.

The $C_{12-30}$ mono-olefins useful in preparing the olefin polymers (B) can be internal olefins (i.e., when the olefinic unsaturation is not in the "-1-" or alpha position) or preferably 1-olefins. These $C_{12-30}$ mono-olefins can be either straight or branched chain, but preferably they are straight chain. Exemplary of such $C_{12-30}$ mono-olefins which can be used to prepare the olefin polymers (B) of this invention are 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene, 1-pentacosene, 1-hexacosene, 1-octacosene, 1-nonacosene, etc. The preferred $C_{12-30}$ mono-olefins are the commercially available alpha olefin fractions such as $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc.

Mono-olefins which are useful in the preparation of the olefin polymers (B) can be derived from the cracking of paraffin wax. The wax cracking process yields both even and odd number $C_{6-20}$ liquid olefins of which 85 to 90 percent are straight chain 1-olefins. The balance of the cracked wax olefins is made up of internal olefins, branched olefins, diolefins, aromatics and impurities. Distillation of the $C_{6-20}$ liquid olefins obtained from the wax cracking process yields fractions (i.e., $C_{15-18}$ alpha-olefins) which are useful in preparing the olefin polymers of this invention.

Other mono-olefins which are useful in preparing the olefin polymers (B) can be derived from the ethylene chain growth process. This process yields even numbered straight chain 1-olefins from a controlled Ziegler polymerization.

Other methods for preparing the mono-olefins of this invention include chlorination-dehydrochlorination of paraffin and catalytic dehydrogenation of paraffins.

The above procedures for the preparation of mono-olefins are well known to those of ordinary skill in the art and are described in detail under the heading "Olefins" in the *Encyclopedia of Chemical Technology*, Second Edition, Kirk and Othmer, Supplement, Pages 632–657, Interscience Publishers, Div. of John Wiley and Son, 1971, which is hereby incorporated by reference for its relevant disclosures pertaining to methods for preparing mono-olefins.

As noted above, the olefin polymers (B) used in this invention can contain small amounts of alicyclic carbon atoms. Such alicyclic carbon atoms can be derived from such monomers as cyclopentene, cyclohexene, ethylene cyclopentane, methylene cyclohexene, 1,3-cyclohexene, norbornene, norbornadiene and cyclopentadiene.

The olefin polymers (B) used in this invention are also substantially saturated in nature. That is, their molecules contain no more than 10% olefinic or acetylenic unsaturation. In other words, there is no more than one olefinic or acetylenic carbon-carbon bond for every ten monovalent carbon-carbon bonds in the molecules of the polymers. Normally, the polymers are free from acetylenic unsaturation.

The olefin polymers (B) used in this invention contain at least about 30 aliphatic carbon atoms; preferably, they contain an average of up to about 3500 carbon atoms; preferably, they contain an average of about 50 to about 700 carbon atoms. In terms of molecular weight, the polymers (B) used in this invention have number average molecular weights as determined by gel permeation chromatography of at least about 420, more preferably, they have a maximum number average molecular weight as determined by gel permeation chromatography of no more than about 50,000; an especially preferred range for number average molecular weights of the polymers (B) used in this invention is about 750 to about 10,000. A particularly preferred range of number average molecular weights is from about 750 to about 3,000. The preferred weight average molecular weight as determined by gel permeation chromatography is at least about 420 up to about 100,000, more preferably about 1,500 to about 20,000.

The molecular weight of the polymers used in this invention can also be defined in terms of inherent viscosity. The inherent viscosity ($n_{inh}$) of these polymers generally is at least about 0.03, preferably at least about 0.07 and being no more than about 1.5, preferably no more than 0.2 deciliters per gram. These inherent viscosities are determined at concentrations of 0.5 gram of polymer in 100 ml. of carbon tetrachloride and at 30° C.

The olefin polymers (B) of this invention are most conveniently obtained by the polymerization of the olefins with Friedel-Crafts polymerization catalyst such as aluminum chloride, boron trifluoride, titanium tetrachloride, or the like. The polymers could also be obtained by the use of "Ziegler Type" catalysts. These catalysts generally include a transition metal compound such as the halide, oxide or alkoxide and an organo-metallic compound wherein the metal is of the Group I—III of the Periodic Chart. Generally, titanium tri- or tetrachloride or vanadium trichloride or oxychloride is combined with a trialkyl or dialkyl aluminum halide such as triethyl aluminum, triisobutyl aluminum or diethyl aluminum chloride.

Additionally, the olefin polymers (B) of this invention can be obtained by chain polymerization of the olefins by the use of free-radical initiators. The free-radical initiators commonly used are organic peroxides. The preferred organic peroxides are di-t-butyl peroxide and benzoyl peroxide. Chain polymerization is well known to those of ordinary skill in the art and is discussed more fully in Schildknecht, C. E., *Allyl Compounds and Their Polymers*, Wiley-Interscience, 1973, pp. 62–63 which is incorporated by reference for its relevant disclosure pertaining to methods of chain polymerization and free-radical initiators useful in chain polymerization.

The hydrocarbyl substituted carboxylic acylating agents of the present invention can be prepared by directly contacting one or more alpha-beta olefinically unsaturated carboxylic reagents (A) with one or more olefin polymers (B) at a temperature in the range of, for example, about 140° C. to about 300° C. The processes for preparing hydrocarbyl-substituted carboxylic acid acylating agents are well known to those of ordinary skill in the art and have been described in detail, for example, in U.S. Pat. Nos. 3,087,936; 3,163,603; 3,172,892; 3,189,544; 3,219,666; 3,231,587; 3,272,746; 3,288,714; 3,306,907; 3,331,776; 3,340,281; 3,341,542;

3,346,354; and 3,381,022 which are incorporated herein by reference.

The hydrocarbyl-substituted carboxylic acylating agent compositions of this invention can also be prepared by reacting one or more alpha-beta olefinically unsaturated carboxylic reagents (A) with one or more olefin polymers (B) in the presence of chlorine or bromine at a temperature within the range of about 100° C. to about 300° C. according to the techniques disclosed in U.S. Pat. Nos. 3,215,707, 3,231,587, and 3,912,764, which are incorporated herein by reference.

The chlorinated or brominated analogs of the olefin polymer (B) can be prepared by conventional techniques well known to those of ordinary skill in the art. For example, the chlorinated analogs of the olefin polymers (B) can be prepared by contacting (i.e., reacting) a 1:1 mole ratio of the olefin polymer (B) with chlorine at 100°-200° C. Excess chlorine may be used; for example, about 1.1 to about 3 moles of chlorine for each mole of olefin polymer (B).

The olefin polymer (B) or chlorinated or brominated analog thereof is generally reacted at a ratio of one equivalent of olefin polymer (B) or chlorinated or brominated analog thereof (for purposes of this invention the equivalent weight of the olefin polymer (B) is equal to its number average molecular weight, as determined by gel permeation chromatography) to from about 0.1 to about 5 moles, usually 0.1 to about 1 mole, with the unsaturated carboxylic reagent (A).

When the olefin polymer (B) and the unsaturated carboxylic reagents (A) are reacted in the presence of chlorine or bromine, the ratios of the reactants are the same as hereinabove-described. The molar ratio of unsaturated carboxylic reagent (A) to chlorine or bromine is generally one mole of (A) to about 0.5 up to about 1.3 mole, usually from about 1 up to about 1.05 mole, of chlorine or bromine.

Reaction Products of the Hydrocarbyl-Substituted Carboxylic Acylating Agents with Amines and/or Alcohols Also included in this invention are the compositions made by reacting the hydrocarbyl-substituted carboxylic acylating agents of the present invention with one or more amines, or one or more alcohols, or mixtures of one or more amines and/or one or more alcohols.

The amines useful for reacting with the hydrocarbyl-substituted carboxylic acylating agents of this invention are characterized by the presence within their structure of at least one H—N< group. These amines can be monoamines or polyamines. Hydrazine and substituted hydrazines containing up to three substituents are included as amines suitable for preparing carboxylic derivative compositions. Mixtures of two or more amines can be used in the reaction with one or more of the acylating agents of the present invention. Preferably, the amine contains at least one primary amino group (i.e., —NH₂). Advantageously, the amine is a polyamine, especially a polyamine containing at least two H—N< groups, either or both of which are primary or secondary amines. The use of polyamines result in carboxylic derivative compositions which are usually more effective as dispersant/detergent additives, than are derivative compositions derived from monoamines. Suitable monoamines and polyamines are described in greater detail hereinafter.

Alcohols which can be reacted with the hydrocarbyl-substituted carboxylic acylating agents of the present invention include monohydric and polyhydric alcohols. Polyhydric alcohols are preferred since they usually result in carboxylic derivative compositions which are more effective as dispersant/detergents than carboxylic derivative compositions derived from monohydric alcohols. Alcohols suitable for use in this invention are described in greater detail hereinafter.

The monoamines and polyamines useful in this invention are characterized by the presence within their structure of at least one H—N< group. Therefore, they have at least one primary (i.e., H₂N—) or secondary amino (i.e., H—N=) group. The amines can be aliphatic, cycloaliphatic, aromatic, or heterocyclic, including aliphatic-substituted aromatic, aliphatic-substituted cycloaliphatic, aliphatic-substituted aromatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic, and heterocyclic-substituted aromatic amines and may be saturated or unsaturated. If unsaturated, the amine is preferably free from acetylenic unsaturation (i.e., —C≡C—). The amines may also contain non-hydrocarbon substituents or groups as long as these groups do not significantly interfere with the reaction of the amines with the acylating reagents of this invention. Such non-hydrocarbon substituents or groups include lower alkoxy, lower alkyl mercapto, nitro, interrupting groups such as —O—and —S—(e.g., as in such groups as —CH₂CH₂—X—CH₂CH₂— where X is —O— or —S—).

With the exception of the branched polyalkylene polyamines, the polyoxyalkylene polyamines and the high molecular weight hydrocarbyl-substituted amines described more fully hereafter, the amines used in this invention ordinarily contain less than about 40 carbon atoms in total and usually not more than about 20 carbon atoms in total.

Aliphatic monoamines include mono-aliphatic and di-aliphatic substituted amines wherein the aliphatic groups can be saturated or unsaturated and straight or branched chain. Thus, they are primary or secondary aliphatic amines. Such amines include, for example, mono- and di-alkyl-substituted amines, mono- and di-alkenyl-substituted amines, and amines having one N-alkenyl substituent and one N-alkyl substituent and the like. The total number of carbon atoms in these aliphatic monoamines preferably do not exceed about 40 and usually do not exceed about 20 carbon atoms. Specific examples of such monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, octadecylamine, and the like. Examples of cycloaliphatic-substituted aliphatic amines, aromatic-substituted aliphatic amines, and heterocyclic-substituted aliphatic amines, include 2-(cyclohexyl)-ethylamine, benzylamine, phenylethylamine, and 3-(furylpropyl)amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamine, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines, and pyranyl-substituted cyclohexylamine.

Suitable aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from maphthylene. Examples of aromatic monoamines include aniline, di(-para-methylphenyl)amine, naphthylamine, N-(n-butyl-)aniline, and the like. Examples of aliphatic-substituted, cycloaliphatic-substituted, and heterocyclic-substituted aromatic monoamines are para-ethoxyaniline, para-dodecylaniline, cyclohexyl-substituted naphthylamine, and thienyl aniline.

Suitable polyamines are aliphatic, cycloaliphatic and aromatic polyamines analogous to be above-described monoamines except for the presence within their structure of another amino nitrogen. The other amino nitrogen can be a primary, secondary or tertiary amino nitrogen. Examples of such polyamines include N-aminopropyl-cyclohexylamines, N-N'-di-n-butyl-para-phenylene diamine, bis-(para-aminophenyl)-methane, 1,4-diaminocyclohexane, and the like.

Heterocyclic mono- and polyamines can also be used in making the substituted carboxylic acid acylating agent derivative compositions of this invention. As used herein, the terminology "heterocyclic mono- and polyamine(s)" is intended to describe those heterocyclic amines containing at least one primary or secondary amino group and at least one nitrogen as a heteroatom in the heterocyclic ring. However, as long as there is present in the heterocyclic mono- and polyamines at least one primary or secondary amino group, the hetero-N atom in the ring can be a tertiary amino nitrogen; that is, one that does not have hydrogen attached directly to the ring nitrogen. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines can contain heteroatoms other than nitrogen, especially oxygen and sulfur. Obviously they can contain more than one nitrogen heteroatom. The five- and six-membered heterocyclic rings are preferred.

Among the suitable heterocyclics are aziridines, azetidines, azolidines, tetra- and di-hydro pyridines, pyrroles, indoles, piperadines, imidazoles, di- and tetra-hydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra-, di- and perhydro-derivatives of each of the above and mixtues of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-di-aminoethylpiperazine.

Hydroxyamines both mono- and polyamines, analogous to those described above are also useful in this invention provided they contain at least one primary or secondary amino group. Hydroxy-substituted amines having only tertiary amino nitrogen such as in tri-hydroxyethyl amine, are thus excluded as an amine, but can be used as an alcohol as disclosed hereafter. The hydroxy-substituted amines contemplated are those having hydroxy substituents bonded directly to a carbon atom other than a carbonyl carbon atom; that is, they have hydroxy groups capable of functioning as alcohols. Examples of such hydroxy-substituted amines include ethanolamine, di-(3-hydroxypropyl)-amine, 3-hydroxybutyl-amine, 4-hydroxybutylamine, diethanolamine, di-(2-hydroxypropyl)-amine, N-(hydroxypropyl)propylamine, pylamine, N-(2-hydroxyethyl)-cyclohexylamine, 3-hydroxycyclopentylamine, para-hydroxyaniline, N-hydroxyethyl piperazine, and the like.

The terms hydroxyamine and aminoalcohol describe the same class of compounds and, therefore, can be used interchangeably. Hereinafter, in the specification and appended claims, the term hydroxyamine will be understood to include aminoalcohols as well as hydroxyamines.

Also suitable as amines are the aminosulfonic acids and derivatives thereof corresponding to the formula:

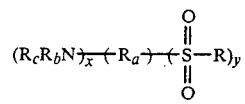

wherein R is —OH, —NH$_2$, ONH$_4$, etc., R$_a$ is a polyvalent organic radical having a valence equal to x+y; R$_b$ and R$_c$ are each independently hydrogen, hydrocarbyl, and substituted hydrocarbyl with the proviso that at least one of R$_b$ and R$_c$ is hydrogen per aminosulfonic acid molecule; x and y are each integers equal to or greater than one. From the formula, it is apparent that each aminosulfonic reactant is characterized by at least one HN< or H$_2$N- group and at least one

group. These sulfonic acids can be aliphatic, cycloaliphatic, or aromatic aminosulfonic acids and the corresponding functional derivatives of the sulfo group. Specifically, the aminosulfonic acids can be aromatic aminosulfonic acids, that is, where R$_a$ is a polyvalent aromatic radical such as phenylene where at least one

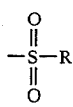

group is attached to a nuclear carbon atom of the aromatic radical. The aminosulfonic acid may also be a mono-amino aliphatic sulfonic acid; that is, an acid where x is one and $R_a$ is a polyvalent aliphatic radical such as ethylene, propylene, trimethylene, and 2-methylene propylene. Other suitable aminosulfonic acids and derivatives thereof useful as amines in this invention are disclosed in U.S. Pat. Nos. 3,926,820; 3,029,250; and 3,367,864; which are incorporated herein by reference.

Hydrazine and substituted-hydrazine can also be used as amines in this invention. At least one of the nitrogens in the hydrazine must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, N,N'-dimethylhydrazine, phenyl-hydrazine, N-phenyl-N'-ethyl-hydrazine, N-(para-tolyl)-N'-(n-butyl)-hydrazine, N-(para-nitrophenyl)-hydrazine, N-(para-nitrophenyl)-N-methylhydrazine, N,N'-di-(para-chlorophenol)-hydrazine, N-phenyl-N'-cyclohexylhydrazine, and the like.

The high molecular weight hydrocarbyl amines, both monoamines and polyamines, which can be used as amines in this invention are generally prepared by reacting a chlorinated polyolefin having a molecular weight of at least about 400 with ammonia or amine. Such amines are known in the art and described, for example, in U.S. Pat. No. 3,275,554 and 3,438,757, both of which are expressly incorporated herein by reference for their disclosure in regard to how to prepare these amines. All that is required for use of these amines is that they possess at least one primary or secondary amino group.

Another group of amines suitable for use in this invention are branched polyalkylene polyamines. The branched polyalkylene polyamines are polyalkylene polyamines wherein the branched group is a side chain containing on the average at least one nitrogen-bonded aminoalkylene

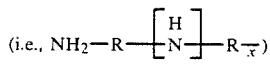
(i.e., $NH_2-R-\left[-N-\right]-R_{\overline{x}}$)

group per nine amino units present on the main chain, for example, 1-4 of such branched chains per nine units on the main chain, but preferably one side chain unit per nine main primary amino groups and at least one tertiary amino group.

These reagents may be expressed by the formula:

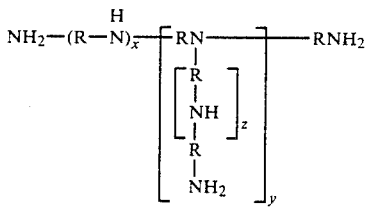

Wherein R is an alkylene group such as ethylene, propylene, butylene and other homologs (both straight chained and branched), etc., but preferably ethylene; and x, y and z are integers, x being, for example, from 4 to 24 or more but preferably 6 to 18, y being, for example, 1 to 6 or more but preferably 1 to 3, and z being, for example, 0-6 but preferably 0-1. The x and y units may be sequential, alternative, orderly or randomly distributed.

The preferred class of such polyamines includes those of the formula:

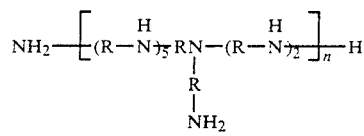

wherein n is an integer, for example, 1-20 or more but preferably 1-3, and R is preferably ethylene, but may be propylene, butylene, etc. (straight chained or branched).

The preferred embodiments are presented by the following formula:

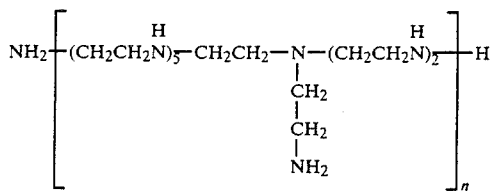

(n = 1-3).

The radicals in the brackets may be joined in a head-to-head or a head-to-tail fashion. Compounds described by this formula wherein n=1-3 are manufactured and sold as Polyamines N-400, N-800, N-1200, etc. Polyamine N-400 has the above formula wherein n=1.

U.S. Pat. Nos. 3,200,106 and 3,259,578 are incorporated herein by reference for their disclosure of how to make such polyamines and processes for reacting them with carboxylic acid acylating agents.

Suitable amines also include polyoxyalkylene polyamines, e.g., poyloxyalkylene diamines and polyoxyalkylene triamines, having average molecular weights ranging from about 200 to 400 and preferably from about 400 to 2000. Illustrative examples of these polyoxyalkylene polyamines may be characterized by the formulae:

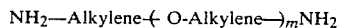

where m has a value of about 3 to 70 and preferably about 10 to 35; and

wherein n is such that the total value is from about 1 to 40 with the proviso that the sum of all of the n's is from about 3 to about 70 and generally from about 6 to about 35, and R is a polyvalent saturated hydrocarbyl radical of up to ten carbon atoms having a valence of 3 to 6. The alkylene groups may be straight or branched chains and contain from 1 to 7 carbon atoms, and usually from 1 to 4 carbon atoms. The various alkylene groups present within the above formulae may be the same or different.

More specific examples of these polyamines include:

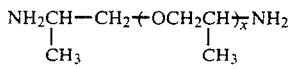

wherein x has a value of from about 3 to 70 and preferably from about 10 to 35 and:

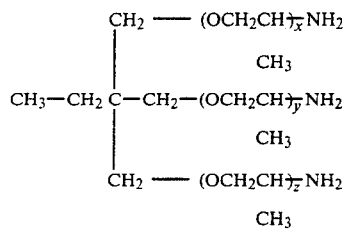

wherein x+y+z have a total value ranging from about 3 to 30 and preferably from about 5 to 10.

Preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeff-amines D-230, D-400, D-1000, D-2000, T-403, etc.".

U.S. Pat. Nos. 3,804,763 and 3,948,800 are incorporated herein by reference for their disclosure of such polyoxyalkylene polyamines and process for acylating them with carboxylic acid acylating agents.

Preferred amines are the alkylene polyamines, including the polyalkylene polyamines, as described in more detail hereafter. The alkylene polyamines include those conforming to the formula:

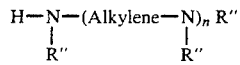

wherein n is from 1 to about 10; each R" is independently a hydrogen atom, a hydrocarbyl group or a hydroxy-substituted hydrocarbyl group having up to about 30 atoms, and the "Alkylene" group has from about 1 to about 10 carbon atoms but the preferred alkylene is ethylene or propylene. Especially preferred are the alkylene polyamines where each R" is hydrogen with the ethylene polyamines and mixtures of ethylene polyamines being the most preferred. Usually n will have an average value of from about 2 to about 7. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines useful in preparing the carboxylic derivative compositions include ethylene diamine, triethylene tetramine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, N-(2-aminoethyl)piperazne, 1,4-bis(2-aminoethyl)piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are especially useful for reasons of cost and effectiveness. Such polyamines are described in detail under the heading "Diamines and Higher Amines" in *The Encyclopedia of Chemical Technology*, Second Edition, Kirk and Othmer, Volume 7, pages 27–39, Interscience Publishers, Division of John Wiley and Sons. 1965, which is hereby incorporated by reference for their disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Hydroxyalkyl alkylene polyamines having one or more hydroxyalkyl substitutents on the nitrogen atoms, are also useful in preparing compositions of the present invention. Preferred hydroxyalkyl-substituted alkylene polyamines are those in which the hydroxyalkyl group is a lower hydroxyalkyl group, i.e., having less than eight carbon atoms. Examples of such hydroxyalkyl-substituted polyamines include N-(2-hydroxyethyl)ethylene diamine, N,N-bis(2-hydroxyethyl)ethylene diamine, 1-(2-hydroxyethyl)-piperazine, monohydroxypropyl-substituted diethylene triamine, dihydroxypropyl-substituted etraethylene pentamine, N-(3-hydroxybutyl)tetramethylene diamine, etc. Higher homologs as are obtained by condensation of the above-illustrated hydroxy alkylene polyamines through amino radicals or through hydroxy radicals are likewise useful as amines in this invention. Condensation through amino radicals results in a higher amine accompanied by removal of ammonia and condensation through the hydroxy radicals results in products containing ether linkages accompanied by removal of water.

The carboxylic derivative compositions produced from the reaction of the hydrocarbyl-substituted carboxylic acylating agents of this invention and the amines described hereinbefore yield acylated amines which include amine salts, amides, imides and imidazolines as well as mixtures thereof. To prepare carboxylic derivatives from the acylating agents and amines, one or more acylating agents and one or more amines are heated, optionally in the presence of a normally liquid, substantially inert organic liquid solvent/diluent, at temperatures in the range of about 80° C. up to the decomposition point (the decomposition point is the temperature at which there is sufficient decomposition of any reactant or product such as to interfere with the production to the desired product) but normally at temperatures in the range of about 100° C. to about 300° C., provided 300° C. does not exceed the decomposition point. Temperatures of about 125° C. to about 250° C. are normally used. The acylating agent and the amine are reacted in amounts sufficient to provide from about one-half equivalent to about 2 moles of amine per equivalent of acylating agent. For purposes of this invention an equivalent of amine is that amount of the amine corresponding to the total weight of amine divided by the total number of nitrogens present. Thus, octylamine has an equivalent weight equal to its molecular weight; ethylene diamine has an equivalent weight equal to one-half its molecular weight; and aminoethylpiperazine has an equivalent weight equal to one-third its molecular weight. Also, for example, the equivalent weight of a commercially available mixture of polyalkylene polyamine can be determined by dividing the atomic weight of nitrogen (14) by the %N contained in the polyamine. Therefore, a polyamine mixture having a %N of 34 would have an equivalent weight of 41.2. The number of equivalents of acylating agent depends on the number of carboxylic functions (e.g., carboxylic acid groups or functional derivatives thereof) present in the acylating agent. Thus, the number of equivalents of acylating agents will vary with the number of carboxy groups present therein. In determining the number of equivalents of acylating agents, those carboxyl functions which are not capable of reacting as a carboxylic acid acylating agent are excluded. In general, however, there is one equivalent of acylating agent for each carboxy group in the acylating agents. For example, there would be two equivalents in the acylating agents derived from the reaction of one mole of olefin polymer and one mole of maleic anhydride. Conventional techniques are readily available for determining the number of carboxyl functions (e.g., acid number, saponification number) and, thus, the number of equivalents of acylating agent available to react with amine.

Because the acylating agents of this invention can be used in the same manner as the high molecular weight acylating agents of the prior art in preparing acylated amines suitable as additives for lubricating oil compositions, U.S. Pat. Nos. 3,172,892; 3,219,666; and 3,272,746 are incorporated herein by reference for their disclosures with respect to the procedures applicable to reacting the substituted carboxylic acid acylating agents of this invention with the amines as described above. In applying the disclosures of these patents to the hydrocarbyl-substituted carboxylic acylating agents of this invention, the latter can be substituted for the high molecular weight carboxylic acid acylating agents disclosed in these patents on an equivalent basis. That is, where one equivalent of the high molecular weight carboxylic acylating agent disclosed in these incorporated patents is utilized, one equivalent of the acylating agent of this invention can be used. These patents are also incorporated by reference for their disclosure of how to use the acylated amines thus produced as additives in lubricating oil compositions. Dispersant/detergent properties can be imparted to lubricating oils by incorporating the acylated amines produced by reacting the acylating agents of this invention with the amines described above on an equal weight basis with the acylated amines disclosed in these patents.

Alcohols useful in preparing carboxylic derivative compositions of this invention from the acylating agents previously described include those compounds of the general formula:

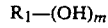

$$R_1-(OH)_m$$

wherein $R_1$ is a monovalent or polyvalent organic radical joined to the —OH groups through carbon-to-oxygen bonds (that is, —COH wherein the carbon is not part of a carbonyl group) and m is an integer of from 1 to about 10, preferably 2 to about 6. As with the amine reactants, the alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the mono- and polyhydric alcohols corresponding to the formula $R_1-(OH)_m$ will usually contain not more than about 40 carbon atoms and generally not more than about 20 carbon atoms. The alcohols may contain non-hydrocarbon substituents of the same type mentioned with respect to the amines above, that is, non-hydrocarbon substituents which do not interfere with the reaction of the alcohols with the acylating reagents of this invention. In general, polyhydric alcohols are preferred.

Among the polyoxyalkylene alcohols suitable for use in the preparation of the carboxylic derivative compositions of this invention are the polyoxyalkylene alcohol demulsifiers for aqueous emulsions. The terminology "demulsifier for aqueous emulsions" as used herein is intended to describe those polyoxyalkylene alcohols which are capable of preventing or retarding the formation of aqueous emulsions or "breaking" aqueous emulsions. The terminology "aqueous emulsion" is generic to oil-in-water and water-in-oil emulsions.

Many commercially available polyoxyalkylene alcohol demulsifiers can be used. Useful demulsifiers are the reaction products of various organic amines, carboxylic acid amides, and quaternary ammonium salts with ethylene-oxide. Such polyoxyethylated amines, amides, and quaternary salts are available from Armour Industrial Chemical Co. under the names Ethoduomeen T, an ethyleneoxide condensation product of an N-alkyl alkylenediamine under the name Duomeen T; Ethomeens, tertiary amines which are ethyleneoxide condensation products of primary fatty amines; Ethomids, ethyleneoxide condensates of fatty acid amides; and Ethoquads, polyoxyethylated quaternary ammonium salts such as quaternary ammonium chlorides.

Preferred demulsifiers are liquid polyoxyalkylene alcohols and derivatives thereof. The derivatives contemplated are the hydrocarbyl ethers and the carboxylic acid esters obtained by reacting the alcohols with various carboxylic acids. Illustrative hydrocarbyl groups are alkyl, cycloalkyl, alkylaryl, aralkyl, alkylaryl alkyl, etc., containing up to about forty carbon atoms. Specific hydrocarbyl groups are methyl, butyl, dodecyl, tolyl, phenyl, naphthyl, dodecylphenyl, p-octylphenyl ethyl, cyclohexyl, and the like. Carboxylic acids useful in preparing the ester derivatives are mono- or polycarboxylic acids such as acetic acid, valeric acid, lauric acid, stearic acid, succinic acid, and alkyl or alkenyl-substituted succinic acids wherein the alkyl or alkenyl group contains up to about twenty carbon atoms. Members of this class of alcohols are commercially available from various sources; e.g., Pluronic polyols from Wyandotte Chemicals Corporation; Polyglycol 112-2, a liquid triol derived from ethyleneoxide and propyleneoxide available from Dow Chemical Co.; and Tergitols, dodecylphenyl or nonylphenyl polyethylene glycol ethers, and Ucons, polyalkylene glycols and various derivatives thereof, both available from Union Carbide Corporation. However, the demulsifiers used must have an average of at least one free alcoholic hydroxyl group per molecule of polyoxyalkylene alcohol. For purposes of describing these polyoxyalkylene alcohols which are demulsifiers, an alcoholic hydroxyl group is one attached to a carbon atom that does not form part of an aromatic nucleus.

In this class of preferred polyoxyalkylene alcohols are those polyols prepared as "block" copolymers. Thus, a hydroxy-substituted compound, $R_2—(OH)_q$ (where q is 1 to 6, preferably 2 to 3, and $R_2$ is the residue of a mono- or polyhydric alcohol or mono- or polyhydroxy phenol, naphthol, etc.) is reacted with an alkylene oxide,

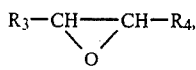

to form a hydrophobic base, $R_3$ being a lower alkyl group of up to four carbon atoms, $R_4$ being H or the same as $R_3$ with the proviso that the alkylene oxide does not contain in excess of ten carbon atoms. This base is then reacted with ethylene oxide to provide a hydrophilic portion resulting in a molecule having both hydrophobic and hydrophilic portions. The relative sizes of these portions can be adjusted by regulating the ratio of reactants, time of reaction, etc., as is obvious to those skilled in the art. It is within the skill of the art to prepare such polyols whose molecules are characterized by hydrophobic and hydrophilic moieties present in a ratio rendering them suitable as demulsifiers for aqueous emulsions in various lubricant compositions and thus suitable as alcohols in the invention. Thus, if more oil-solubility is needed in a given lubricant composition, the hydrophobic portion can be increased and/or hydrophilic portion decreased. If greater aqueous emulsion breaking capability is required, the hydrophilic and/or hydrophobic portions can be adjusted to accomplish this.

Compounds illustrative of $R_1—(OH)_q$ include aliphatic polyols such as the alkylene glycols and alkane polyols, e.g., ethylene glycol, propylene glycol, trimethylene glycol, glycerol, pentaerythritol, erythritol, sorbitol, mannitol, and the like and aromatic hydroxy compounds such as alkylated mono- and polyhydric phenols and naphthols, e.g., cresols, heptylphenols, dodecylphenols, dioctylphenols, triheptylphenols, resorcinol, pyrogallol, etc.

Polyoxyalkylene polyol demulsifiers which have two or three hydroxyl groups and molecules consisting essentially of hydrophobic portions comprising

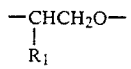

where $R_1$ is lower alkyl of up to three carbon atoms and hydrophilic portions comprising $—CH_2CH_2O—$ groups are particularly preferred. Such polyols can be prepared by first reacting a compound of the formula $R_1—(OH)_q$ where q is 2-3 with a terminal alkylene oxide of the formula

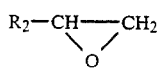

and then reacting that product with ethylene oxide. $R_1—(OH)_q$ can be, for example, TMP (trimethylolpropane), TME (trimethylolethane), ethylene glycol, trimethylene glycol, tetramethylene glycol, tri-(beta-hydroxypropyl)amine, 1,4-(2-hydroxyethyl)-cyclohexane, N,N,N',N'-tetrakis(2-hydroxypropyl)ethylene diamine, N,N,N',N'-tetrakis(2-hydroxyethyl)ethylene diamine, naphthol, alkylated naphthol, resorcinol, or one of the other illustrative examples mentioned hereinbefore.

The polyoxyalkylene alcohol demulsifiers should have an average molecular weight of 1000 to about 10,000, preferably about 2000 to about 7000. The ethyleneoxy groups (i.e., $—CH_2CH_2O—$) normally will comprise from about 5% to about 40% of the total average molecular weight. Those polyoxyalkylene polyols where the ethyleneoxy groups comprise from about 10% to about 30% of the total average molecular weight are especially useful. Polyoxyalkylene polyols having an average molecular weight of about 2500 to about 6000 where approximately 10%-20% by weight of the molecule is attributable to ethyleneoxy groups result in the formation of esters having particularly improved demulsifying properties. The ester and ether derivatives of these polyols are also useful.

Representative of such polyoxyalkylene polyols are the liquid polyols available from Wyandotte Chemicals Company under the name Pluronic Polyols and other similar polyols. These Pluronic Polyols correspond to the formula

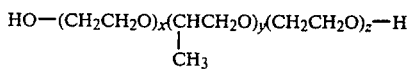

wherein x, y, and z are integers greater than 1 such that the $—CH_2CH_2O—$ groups comprise from about 10% to about 15% by weight of the total molecular weight of the glycol, the average molecular weight of said polyols being from about 2500 to about 4500. This type of polyol can be prepared by reacting propylene glycol with propylene oxide and then with ethylene oxide.

Another group of polyoxyalkylene alcohol demulsifiers illustrative of the preferred class discussed above are the commercially available liquid Tetronic polyols sold by Wyandotte Chemicals Corporation. These polyols are represented by the general formula:

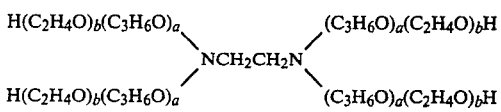

Such polyols are described in U.S. Pat. No. 2,979,528 which is incorporated herein by reference. Those polyols corresponding to the above formula having an average molecular weight of up to about 10,000 wherein the ethyleneoxy groups contribute to the total molecular weight in the percentage range discussed above are preferred. A specific example would be such a polyol having an average molecular weight of about 8000 wherein the ethyleneoxy groups account for 7.5%-12% by weight of the total molecular weight. Such polyols can be prepared by reacting an alkylene diamine such as ethylene diamine, propylene diamine, hexamethylene diamine etc., with propylene oxide until the desired weight of the hydrophobic portion is reached. Then the resulting product is reacted with ethylene oxide to add the desired number of hydrophilic units to the molecules.

Another commercially available polyoxyalkylene polyol demulsifier falling within this preferred group is Dow Polyglycol 112-2, a triol having an average molecular weight of about 4000-5000 prepared from propylene oxides and ethylene oxides, the ethyleneoxy groups comprising about 18% by weight of the triol. Such triols can be prepared by first reacting glycerol, TME, TMP, etc., with propylene oxide to form a hydrophobic base and reacting that base with ethylene oxide to add hydrophilic portions.

Alcohols useful in this invention also include alkylene glycols and polyoxyalkylene alcohols such as polyoxyethylene alcohols, polyoxypropylene alcohols, polyoxybutylene alcohols, and the like. These polyoxyalkylene alcohols (sometimes called polyglycols) can contain up to about 150 oxyalkylene groups and the alkylene radical contains from 2 to about 8 carbon atoms. Such polyoxyalkylene alcohols are generally dihydric alcohols. That is, each end of the molecule terminates with a —OH group. In order for such polyoxyalkylene alcohols to be useful, there must be at least one such —OH group. However, the remaining —OH group can be esterified with a monobasic, aliphatic or aromatic carboxylic acid of up to about 20 carbon atoms such as acetic acid, propionic acid, oleic acid, stearic acid, benzoic acid, and the like. The monoethers of these alkylene glycols and polyoxyalkylene glycols are also useful. These include the monoaryl ethers, monoalkyl ethers, and monoaralkyl ethers of these alkylene glycols and polyoxyalkylene glycols. This group of alcohols can be represented by the general formula

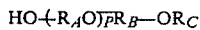

where $R_A$ and $R_B$ are independently alkylene radicals of 2 to 8 carbon atoms; and $R_C$ is aryl such as phenyl, lower alkoxy phenyl, or lower alkyl phenyl; lower alkyl such as ethyl, propyl, tertbutyl, pentyl, etc.; and aralkyl such as benzyl, phenylethyl, phenyllpropyl, p-ethylphenylethyl, etc.; p is zero to about eight, preferably two to four. Polyoxyalkylene glycols where the alkylene groups are ethylene or propylene and p is at least two as well as the monoethers thereof as described above are very useful.

The monohydric and polyhydric alcohols useful in this invention include monohydroxy and polyhydroxy aromatic compounds. Monohydric and polyhydric phenols and naphthols are preferred hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain 1 to 4 hydroxy groups. The aromatic hydroxy compounds are illustrated by the following specific examples: phenol, p-chlorophenol, p-nitrophenol, beta-naphthol, alpha-naphthol, cresols, resorcinol, catechol, carvacrol, thymol, eugenol, p,p'-dihydroxy-biphenyl, hydroquinone, pyrogallol, phloroglucinol, hexylresorcinol, orcin, quaiacol, 2-chlorophenol, 2,4-dibutylphenol, propenetetramer-substituted phenol, di-dodecylphenol, 4,'4-methylene-bis-methylene-bis-phenol, alpha-decyl-beta-naphthol, polyisobutenyl-(molecular weight of about 1000)-substituted phenol, the condensation product of heptylphenol with 0.5 moles of formaldehyde, the condensation product of octylphenol with acetone, di(hydroxyphenyl)oxide, di(hydroxyphenyl)sulfide, di(hydroxyphenyl)-disulfide, and 4-cyclohexylphenol. Phenol itself and aliphatic hydocarbon-substituted phenols, e.g., alkylated phenols having up to 3 aliphatic hydrocarbon substituents are especially preferred. Each of the aliphatic hydrocarbon substituents may contain 100 or more carbon atoms but usually will have from 1 to 20 carbon atoms. Alkyl and alkenyl groups are the preferred aliphatic hydrocarbon substitutents.

Further specific examples of monohydric alcohols which can be used include monohydric alcohols such as methanol, ethanol, isooctanol, dodecanol, cyclohexanol, cyclopentanol, behenyl alcohol, hexatriacontanol, neopentyl alcohol, isobutyl alcohol, benzyl alcohol, beta-phenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, sec-pentyl alcohol, tertbutyl alcohol, 5-bromo-dodecanol, nitro-octadecanol, and dioleate of glycerol. Alcohols useful in this invention may be unsaturated alcohols such as allyl alcohol, cinnamyl alcohol, 1-cyclohexene-3-ol and oleyl alcohol.

Other specific alcohols useful in this invention are the ether alcohols and amino alcohols including, for example, the oxyalkylene, oxyarylene-, amino-alkylene-, and amino-arylene-substituted alcohols having one or more oxyalkylene, aminoalkylene or amino-aryleneoxy-arylene radicals. They are exemplified by Cellosolve, carbitol, phenoxyethanol, heptylphenyl-(oxypropylene)$_6$-OH, octyl-(oxyethylene)$_{30}$-OH, phenyl-(oxyoctylene)$_2$-OH, mono-(heptylphenyloxypropylene)-substituted glycerol, poly-(styreneoxide), aminoethanol, 3-aminoethylpentanol, di(hydroxyethyl)amine, p-aminophenol, tri(hydroxypropyl)amine, N-hydroxyethyl ethylenediamine, N,N,N',N'-tetrahydroxy-trimethylenediamine, and the like.

The polyhydric alcohols preferably contain from 2 to about 10 hydroxy radicals. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene radicals contain 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used. The carbohydrates may be exemplified by glucose, fructose, sucrose, rhamose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful. Further specific examples of such partially esterified polyhydric alcohols are the monooleate of sorbitol, distearate of sorbitol, monooleate of glycerol, monostearate of glycerol, di-dodecanoate of erythritol, and the like.

A preferred class of alcohols suitable for use in this invention are those polyhydric alcohols containing up to about 12 carbon atoms, and especially those containing three to ten carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxy-methyl)cyclohexanol, 1,10-decanediol, digitalose, and the like. Aliphatic alcohols containing at least three hydroxyl groups and up to ten carbon atoms are particularly preferred.

Another preferred class of polyhydric alcohols for use in this invention are the polyhydric alkanols containing three to ten carbon atoms and particularly, those containing three to six carbon atoms and having at least three hydroxyl groups. Such alcohols are exemplified by glycerol, erythritol, pentaerythritol, mannitol, sorbitol, 2-hydroxymethyl-2-methyl-1,3-propanediol(trimethylolethane), 2-hydroxymethyl-2-ethyl-1,3-propanediol(trimethylopropane), 1,2,4-hexanetriol, and the like.

The amines useful in accordance with the present invention may contain alcoholic hydroxy substituents and alcohols that are useful can contain primary, secondary, or tertiary amino substituents. Thus, hydroxyamines can be catagorized as both amine and alcohol provided they contain at least one primary or secondary amino group. If only tertiary amino groups are present, the amino alcohol belongs only in the alcohol catagory. Typically, the hydroxyamines are primary, secondary or tertiary alkanol amines or mixtures thereof. Such amines can be represented, respectfully, by the formulae:

$H_2N-R'-OH$

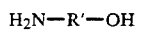

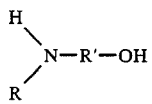

and

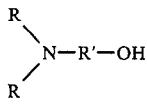

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formulae represents the hydroxyl-substituted hydrocarbyl group. R' can be an acyclic, alicyclic or aromatic group. Typically, it is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to 7 carbon atoms.

The hydroxyamines can also be ether N-(hydroxyl-substituted hydrocarbyl)amines. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines can be conveniently prepared by reaction of epoxides with afore-described amines and can be represented by the formulae:

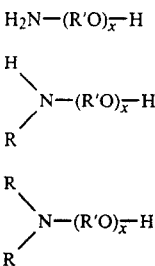

wherein x is a number from 2 to about 15 and R and R' are as described above.

Polyamine analogs of these hydroxy amines, particularly alkoxylated alkylene polyamines (e.g., N,N-(diethanol)-ethylene diamine) can also be used in accordance with the present invention. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl)-ethylene diamine, 1-(2-hydroxyethyl)piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino radicals or through hydroxy radicals are likewise useful. Condensation through amino radicals results in a higher amine accompanied by removal of ammonia while condensation through the hydroxy radicals results in products containing ether linkages accompanied by removal of water. Mixtures of two or more of any of the aforedescribed mono- or polyamines are also useful.

Particularly useful examples of N-(hydroxyl-substituted hydrocarbyl)amines include mono-, di-, and triethanol amine, diethylethanol amine, di-(3-hydroxyl butyl) amine, N-(3-hydroxyl butyl) amine, N-(4-hydroxyl butyl) amine, N,N-di-(2-hydroxyl propyl) amine, N-(2-hydroxyl ethyl) morpholine and its thio analog, N-(2-hydroxyl ethyl) cyclohexyl amine, N-3-hydroxyl cyclopentyl amine, o-, m- and p-aminophenol, N-(hydroxyl ethyl) piperazine, N,N'-di(hydroxyl ethyl) piperazine, and the line. Preferred hydroxy amines are diethanolamine and triethanolamine.

Further amino alcohols are the hydroxy-substituted primary amines described in U.S. Pat. No. 3,576,743 by the general formula

where $R_a$ is a monovalent organic radical containing at least one alcoholic hydroxy group, according to this patent, the total number of carbon atoms in $R_a$ will not exceed about 20. Hydroxyl-substituted aliphatic primary amines containing a total of up to about 10 carbon atoms are particularly useful. Especially preferred are the polyhydroxyl-substituted alkanol primary amines wherein there is only one amino group present (i.e., a primary amino group) having one alkyl substituent containing up to 10 carbon atoms and up to 6 hydroxyl groups. These alkanol primary amines correspond to $R_a$—$NH_2$ wherein $R_a$ is a mono-O or polyhydroxy-substituted alkyl group. It is desirable that at least one of the hydroxyl groups be a primary alcoholic hydroxyl group. Trismethylolaminomethane is a particularly preferable hydroxy-substituted primary amine. Specific examples of the hydroxyl-substituted primary amines include 2-amino-1-butanol, 2-amino-2-methyl-1-propanol, p-(beta-hydroxyethyl)-analine, 2-amino-1-propanol, 3-amino-1-propanol, 2-amino-2-methyl-1,3-propanediol, 2-amino-2-ethyl-1,3-propanediol, N-(beta-hydroxypropyl)-N'-(beta-aminoethyl)-piperazine, tris(-hydroxymethyl)amino methane (also known as trismethylolamino methane), 2-amino-1-butanol, ethanolamine, beta-(beta-hydroxy ethoxy)-ethyl amine, glucamine, glusoamine, 4-amino-3-hydroxy-3methyl-1-butene (which can be prepared according to procedures known in the art by reacting isopreneoxide with ammonia), N-3-(aminopropyl)-4-(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxy ethoxyethyl)-ethylenediamine, and the like. For further description of the hydroxy-substituted primary amines contemplated as being useful as amines and/or alcohols, U.S. Pat. No. 3,576,743 is incorporated herein by reference for its disclosure of such amines.

The carboxylic derivative compositions produced by reacting the acylating reagents of this invention with alcohols are esters. Both acidic esters and neutral esters are contemplated as being within the scope of this invention. Acidic esters are those in which some of the carboxylic acid functions in the acylating reagents are not esterified but are present as free carboxyl groups. Obviously, acid esters are easily prepared by using an amount of alcohol insufficient to esterify all of the carboxyl groups in the acylating reagents of this invention.

The acylating agents of this invention are reacted with the alcohols according to conventional esterification techniques. It normally involves heating the acylating agent of this invention with the alcohol, optionally in the presence of a normally liquid, substantially inert, organic liquid solvent/diuent and/or in the presence of esterification catalyst. Temperatures of at least about 100° C. up to the decomposition point are used (the decomposition point having been defined hereinbefore). This temperature is usually within the range of about 100° C. up to about 300° C. with temperature of about 140° C. to 250° C. often being employed. Usually, at least about one-half equivalent of alcohol is used for each equivalent of acylating agent. An equivalent of acylating reagent is the same as discussed above with respect to reaction with amines. An equivalent of alcohol is its molecular weight divided by the total number of hydroxyl groups present in the molecule. Thus, an equivalent weight of ethanol is its molecular weight while the equivalent weight of ethylene glycol is one-half its molecular weight. The amino-alcohols have equivalent weights equal to the molecular weight divided by the total number of hydroxy groups and nitrogen atoms present in each molecule.

Many issued patents disclose procedures for reacting high molecular weight carboxylic acid acylating agents with alcohols to produce acidic esters and neutral esters. These same techniques are applicable to preparing esters from the acylating agents of this invention and the alcohols described above. All that is required is that the acylating agents of this invention are substituted for the high molecular weight carboxylic acid acylating reagents discussed in these patents, usually on an equivalent weight basis. The following U.S. patents are expressly incorporated herein by reference for their disclosure of suitable methods for reacting the acylating reagents of this invention with the alcohols described above: U.S. Pat. Nos. 3,331,776; 3,381,022; 3,522,179; 3,542,680; 3,697,429; 3,755,169.

Suitable substantially inert, organic liquid solvents or diluents may be used in the reaction processes of the present invention and include such relatively low boiling liquids as hexane, heptane, benzene, toluene, xylene, etc., as well as high boiling materials such as solvent neutral oils, bright stocks, and various types of synthetic and natural lubricating oil base stocks. Factors governing the choice and use of such materials are well known to those of skill in the art. Normally such diluents will be used to facilitate heat control, handling, filtration, etc. It is often desirable to select diluents which will be compatible with the other materials, which are to be present in the environment where the product is intended to be used.

As used in the specification and appended claims, the term "substantially inert" when used to refer to solvents, diluents, and the like, is intended to mean that the solvent, diluent, etc., is inert to chemical or physical change under the conditions in which it is used so as not to materially interfere in an adverse manner with the preparation, storage, blending and/or functioning of the compositions, additives, compounds, etc., of this invention in the context of its intended use. For example, small amounts of a solvent, diluent, etc., can undergo minimal reaction or degradation without preventing the making and using of the invention as described herein. In other words, such reaction or degradation, while technically discernible, would not be sufficient to deter the practical worker of ordinary skill in the art from making and using the invention for its intended purposes. "Substantially inert" as used herein is, thus, readily understood and appreciated by those of ordinary skill in the art.

As previously described, substantially inert organic liquid solvents or diluents may be used in this reaction. The compositions of this invention can be recovered from such solvent/diluents by such standard procedures as distillation, evaporation, and the like, when desired. Alternatively, if the solvent/diluent is, for example, a base suitable for use in a functional fluid, the product can be left in the solvent/diluent and used to form the lubricating, fuel or functional fluid composition as described below. The reaction mixture can be purified by conventional means (e.g., filtration, centrifugation, etc.), if desired.

The aforesaid invention is illustrated by the following specific examples. In these examples, as well as elsewhere in the specification and appended claims, all percentages and parts are by weight (unless otherwise stated expressly to the contrary) and the molecular weights are number average molecular weights (Mn) as determined by gel permeation chromatography (GPC).

EXAMPLE 1

A mixture of 1000 parts of n-hexane and 190 parts of aluminum chloride is cooled to a temperature of −5° to −10° C. 6390 parts of a commercial $C_{15-18}$ alpha-olefin is added dropwise to the mixture over a period of four to six hours. The mixture is maintained at a temperature of −5° C. for one hour with stirring. 170 parts of an aqueous solution of sodium hydroxide is added dropwise to the mixture to deactivate the catalyst. The mixture is filtered. The filtrate is stripped to yield the residue as the desired polymer product ($n_{inh}$=0.060 (1.0 grams/100 m. CCl$_4$, 30° C.)).

EXAMPLE 2

A mixture of 4862 parts of the polymer prepared in Example 1 and 292 parts of maleic anhydride is heated to 180° C. At 180° C. to 200° C., chlorine is bubbled into the mixture over an eight-hour period. The mixture is then blown with nitrogen for one hour at 180° C. The residue is the desired acylating agent.

EXAMPLE 3

A mixture of 4352 parts of the acylating agent prepared in Example 2 and 1088 parts of diluent oil are heated to 160° C. 92.2 parts aminopropylmorpholine and 33.0 parts diethylenetetramine are premixed and then added to the reaction mixture dropwise under a thin stream of nitrogen. The mixture is maintained at 160° to 170° C. for a total of two hours including the period provided for amine addition. The mixture is filtered and the filtrate is the desired product.

EXAMPLE 4

A mixture of 2175 parts methylene chloride and 90 parts aluminum chloride is cooled to 31 5° C. A mixture of 3000 parts of a commercial 1-dodecene available from Gulf Oil Company, 31.2 parts t-butyl chloride and 2175 parts methylene chloride is premixed and added dropwise to the mixture of methylene chloride and aluminum chloride over a period of five hours. After the addition is complete, the reaction mixture is maintained at −5° C. for one hour. 100 parts sodium hydroxide is added to the reaction mixture dropwise to deactivate the catalyst. The reaction mixture is filtered and stripped. The residue is the desired polymer product ($n_{inh}$=0.18 (0.5 grams/100 ml. CCl$_4$, 30° C.)).

EXAMPLE 5

A mixture of 1700 parts of the polymer prepared in Example 4 and 55 parts of maleic anhydride is heated to 170° C. At 170° to 190° C., chlorine is bubbled into the reaction mixture over a period of nine hours. The reaction mixture is then blown with nitrogen for one hour at 190° C. The residue is the desired acylating agent.

EXAMPLE 6

A mixture of 975 parts of the acylating agent prepared in Example 5 and 1218 parts of diluent oil are heated to 160° C. A mixture of 20.5 parts aminopropylmorpholine and 10.7 parts of pentaethylenehexamine are premixed and added to the reaction mixture over a period of 30 minutes under a thin stream of nitrogen. After addition of the amines, the reaction mixture is heated at 160° C. for one hour under a thin stream of nitrogen. The reaction mixture is filtered. The filtrate is the desired product.

EXAMPLE 7

At 120° C., 268 parts of di-t-butyl peroxide is added slowly to 5357 parts of a commercially available $C_{15-18}$ alpha-olefin. The reaction mixture is maintained at 130° C. for 24 hours. The reaction mixture is then stripped at 205° C. under vacuum to yield the desired polymer ($n_{inh}$=0.085).

EXAMPLE 8

The procedure of Example 2 is repeated except that the polymer of Example 1 is replaced on an equal weight basis by the polymer prepared in Example 7.

EXAMPLE 9

The procedure of Example 3 is repeated except that the acylating agent prepared in Example 2 is replaced on an equivalent basis by the acylating agent prepared in Example 8.

As previously indicated, the compositions of this invention are are useful as additives for lubricants, in which they function primarily as detergent/dispersants. They can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, and the like. They can also be used in gas engines, stationary power engines and turbines and the like. Automatic transmission fluids, transaxle lubricants, gear lubricants, metal-working lubricants, hydraulic fluids and other lubricating oil and grease compositions can also benefit from the incorporation therein of the compositions of the present invention.

Natural oils include animal oils and vegetable oils (e.g., castor oil, lard oil) as well as solvent-refined or acid-refined mineral lubricating oils of the paraffinic, naphthenic, or mixed paraffin-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benezenes (e.g., dodecylbenzenes, tetradecylbenzenes, dinonylbenzenes, di-(2-ethylhexyl) benzenes, etc.); polyphenols (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene gycol ether having an average molecular weight of 1000, diphenyl ether of polyethylene glycol having a molecular weight of 500-1000, diethyl ether of polypropylene glycol having a molecular weight of 1000-1500, etc.) or mono- and polycarboxylic esters thereof, for example, the acetic acid esters, mixed $C_3$-$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)-silicate, hexyl-(4-methyl-2-pentoxy)-di-siloxane, poly(methyl)-siloxanes, poly-(methylphenyl)-siloxanes, etc.). Other synthetic lubricating oils include liquid esters of phosphorus-containing acid (e.g., tricresyl phosphate, trioctyl phosphate, diethyl ester of decane phosphonic acid, etc., polymeric tetrahydrofurans, and the like.

Unrefined, refined and rerefined oils (and mixtures of each with each other) of the type disclosed hereinabove can be used in the lubricant compositions of the present invention. Unrefined oils are these obtained directly from a natural or synthetic source without further purification treatement. For example, a shale oil obtained directly from retorting operations, a petroleum oil obtained directly from distillation or ester oil obtained directly from an esterification process and used without further treatment would be an unrefined oil. Refined oils are similar to the unrefined oils excepted that they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally, the lubricants of the present invention contain an amount of the composition of this invention sufficient to provide it with detergent/dispersant properties. Normally this amount will be about 0.05% to about 20%, preferably about 0.1% to about 10% of the total weight of the lubricant. In lubricating oils operated under extremely adverse conditions, such as lubricating oils for marine diesel engines, the reaction products of this invention may be present in amounts of up to about 30% by weight.

The invention also contemplates the use of other additives in combination with the nitrogen-containing esters of this invention. Such additives include, for example, auxiliary detergents and dispersants of the ash-producing or ashless type, corrosion- and oxidation-inhibiting agents, viscosity improving agents, extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200 ° C.

Auxiliary ashless detergents and dispersants are so called despite the fact that, depending on its constitution, the dispersant may upon combustion yield a nonvolatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as amine, organic hydroxy compounds such as phenols and alcohols, and/or basic inorganic materials. Examples of these "carboxylic dispersants" are described in British Pat. No. 1,306,529 and in many U.S. patents including the following: U.S. Pat. Nos. 3,163,603; 3,351,552; 3,541,012; 3,184,474; 3,381,022; 3,542,678; 3,215,707; 3,399,141; 3,542,680; 3,219,666; 3,415,750; 3,567,637; 3,271,310; 3,433,744; 3,574,101; 3,272,746; 3,444,170; 3,576,743; 3,281,357; 3,448,048; 3,630,904; 3,306,908; 3,448,049; 3,632,510; 3,311,558; 3,451,933; 3,632,511; 3,316,177; 3,454,607; 3,697,428; 3,340,281; 3,467,668; 3,725,441; 3,341,542; 3,501,405; Re 26,433; 3,346,493; 3,522,179.

(2) Reaction products of relatively high molecular weight aliphatic or alicyclic halides with amines, preferably polyalkylene polyamines. These may be characterized as "amine dispersants" and examples thereof are described for example, in the following U.S. Pat. Nos.: 3,275,554; 3,454,555; 3,438,757; 3,565,804.

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative: U.S. Pat. Nos. 3,413,347; 3,725,480; 3,697,574; 3,726,882; 3,725,277.

(4) Products obtained by post-treating the caboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos.: 3,036,003; 3,282,955; 3,493,520; 3,639,242; 3,087,936; 3,312,619; 3,502,677; 3,649,229; 3,200,107; 3,366,569; 3,513,093; 3,649,659; 3,216,936; 3,367,943; 3,533,945; 3,658,836; 3,254,025; 3,373,111; 3,539,633; 3,697,574; 3,256,185; 3,403,102; 3,573,010; 3,702,757; 3,278,550; 3,442,808; 3,579,450; 3,703,536; 3,280,234; 3,455,831; 3,591,598; 3,704,308; 3,281,428; 3,455,832; 3,600,372; 3,708,522.

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Pat. Nos.: 3,329,658; 3,666,730; 3,449,250; 3,687,849; 3,519,565; 3,702,300.

The above-noted patents are incorporated by reference herein for their disclosures of ashless dispersants.

Extreme pressure agents and corrosion- and oxidation-inhibiting agents are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The normally liquid fuel compositions of this invention are generally derived from petroleum sources, e.g., normally liquid petroleum distillate fuels, though they may include those produced synthetically by the Fischer-Tropsch and related processes, the processing of organic waste material or the processing of coal, lignite or shale rock. Such fuel composition have varying boiling ranges, viscosities, cloud and pour points, etc., according to their end use as is well known to those of skill in the art. Among such fuels are those commonly known as motor gasoline, diesel fuels, kerosene, distillate fuels, heating oils, residual fuels, bunker fuels, etc. The properties of such fuels are well known to skilled artisans as illustrated, for example, by ASTM Specifications D #396-73 (Fuel Oils) and D #439-73 (Gasolines) available from the American Society for Testing Materials, 1916 Race Street, Philadelphia, Pa. 19103. Particularly preferred is gasoline, that is, a mixture of hydrocarbons having an ASTM boiling point of about 60° C. at the 10% distillation point to about 205° C. at the 90% distillation point. Such gasolines are further described in ASTM Specification D-439-68T.

The fuel compositions of the present invention can contain about 0.001% to about 5% (based on the weight of the final composition), preferably about 0.001% to about 1%, of the compositions described by this invention. The presence of these products can impart many desirable characteristics to the fuel composition depending upon the particular composition and fuel mixture selected. Thus in gasolines they may improve the overall composition ability to retard corrosion of metal parts with which it may come in contact or improve the fuel's ability to clean carburetors and reduce carburetor icing. On the other hand, these products can be used in fuel oil compositions and other normally liquid petroleum distillate fuel compositions to impart anti-screen clogging and demulsifying properties to the fuel.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, anti-oxidants such as 2,6di-tertiary-butyl-4-methylphenol, rust inhibitors, such as alkylated succinic acids and anhydrides, bacteriostatic agents, gum inhibitors, metal deactivators, upper cylinder lubricants and the like.

In one embodiment of the present invention, the afore-described compositions are combined with other ashless dispersants for use in fuels and lubricants. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645; British Pat. Nos. 981,850 and 1,055,337; and U.S. Pat. Nos. 3,255,108; 3,311,558; 3,331,776; 3,346,354; 3,579,450; 3,542,680; 3,381,022; 3,639,242; 3,697,428; 3,708,522; and British Patent Specification No. 1,306,529. These patents are expressly incorporated herein by reference for their disclosure of suitable esters and methods for their preparation.

Generally, the weight ratio of the compositions of this invention to the aforesaid ashless dispersants is about 0.1 to 10.0, preferably about 1.0 to 10 parts of reaction product to one part ashless dispersant. Preferred weight ratios are between 0.5 to 2.0 parts reaction product to 1 part dispersant. In still another embodiment of this invention, the inventive additives are combined with Mannich condensation products formed from substituted phenols, aldehydes, polyamines, and substituted pyridines. Such condensation products are described in U.S. Pat. Nos 3,649,659; 3,558,743; 3,539,633; 3,704,308; and 3,725,277, which are incorporated herein by reference for their disclosure of the preparation of the Mannich condensation products and their use in fuels and lubricants. When the additives of this invention are combined with the Mannich condensation products, a weight ratio of about 10 to about 0.1 parts reaction product of this invention per one part Mannich condensation product is used.

The compositions of this invention can be added directly to the fuel or lubricant. Preferably, however, they are diluted with a substantially inert, normally liquid organic diluent such as mineral oil, naphtha, benzene, toluene or xylene, to form an additive concentrate. These concentrates usually contain about 20-90% by weight of the composition of this invention and may contain, in addition, one or more other additives known in the art or described hereinabove.

This invention relates to improved lubricating oils and normally liquid fuels and particularly concerns automobile and diesel crankcase lubricating oils containing the above-described novel compositions.

An engine performance levels increase, there is a need for more additives and higher treatment levels of additives in lubricating oils. But, the lubricants must continue to provide resistance to thickening at low temperatures and thinning at high temperatures.

The formulation of lubricant compositions containing higher levels (i.e., about 2.5% by weight of chemical or higher for automobile crankcase lubricating oils and 6% by weight of chemical or higher for diesel crankcase lubricating oils) of prior art detergent/dispersants becomes difficult because of the thickening contribution of the prior art detergent/dispersants at low temperatures, particularly at 0° F.

The novel compositions of this invention help alleviate this problem. This invention provides substituted carboxylic acid acylating agents and acylated amine and alcohol derivatives thereof which have lower viscosities than those of the prior art and, therefore, contribute less to the low temperature viscosity of a formulation.

Thus, one of ordinary skill in the art of lubricants and fuels would see other advantages of this invention. These other advantages include such benefits as less diluent/solvent needed to facilitate handling, thus reducing costs, storage space, etc. Also, lubricating oils could be formulated using higher viscosity base oils and, therefore, yielding greater flexibility in lubricant formulation.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed is:

1. A composition comprising: the reaction product of (I):
   (A) one or more alpha-beta olefinically unsaturated carboxylic reagents containing two to about 20 carbon atoms exclusive of the carboxyl-based groups with
   (B) one or more olefin polymers of at least 30 carbon atoms selected from the group consisting of
      (i) polymers of $C_{12}$–$C_{30}$ mono-olefins with the proviso that said polymers exclude polymers derived from ethylene and
      (ii) chlorinated or brominated analogs of (i):
reacted with (II) one or more amines, one or more alcohols, or a mixture of one or more amines and/or one or more alcohols.

2. The composition of claim 1 wherein components (A) and (B) are reacted in the presence of chlorine or bromine.

3. The composition of claim 1 wherein component (A) is monobasic or polybasic.

4. The composition of claim 1 wherein component (A) is carboxylic acid or a functional derivative of carboxylic acid.

5. The composition of claim 1 wherein component (A) is represented by the formula

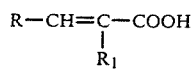

wherein R is hydrogen or a saturated aliphatic or heterocyclic group, $R_1$ is hydrogen or a lower alkyl group and the total number of carbon atoms in R and $R_1$ does not exceed 18 carbon atoms.

6. The composition of claim 1 wherein component (A) is a dibasic carboxylic acid or a derivative of such dibasic carboxylic acid.

7. The composition of claim 1 wherein component (A) is a mono-, di-, tri- or tetracarboxylic acid, or a derivative of such acid selected from the group consisting of anhydride, ester, acylated nitrogen, acid halide, nitrile, ammonium salt and metal salts.

8. The composition of claim 1 wherein component (A) is selected from the group consisting of acrylic acid, methacrylic acid, fumaric acid, maleic acid, lower alkyl esters of such acids, maleic anhydride, and mixtures of two or more of any of these.

9. The composition of claim 1 wherein component (A) is maleic anhydride.

10. The composition of claim 1 wherein said olefin polymers (B) are homopolymers and/or interpolymers of mono-olefins of from 12 to 30 carbon atoms.

11. The composition of claim 1 wherein said olefin polymers (B) are homopolymers and/or interpolymers of mono-olefins of from 18 to 24 carbon atoms.

12. The composition of claim 1 wherein said olefin polymers (B) are homopolymers and/or interpolymers of mono-olefins of from 15 to 18 carbon atoms.

13. The composition of claim 1 wherein said olefin polymers (B) are polymers of mono-1-olefins of from 12 to 30 carbon atoms.

14. The composition of claim 1 wherein said olefin polymers (B) are polymers of mono-1-olefins of from 15 to 18 carbon atoms.

15. The composition of claim 1 wherein said olefin polymers (B) are polymers of mono-1-olefins of from 18 to 24 carbon atoms.

16. The composition of claim 1 wherein said olefin polymers (B) are polymers of mono-olefins selected from the group consisting of the following alpha-olefin mixtures: $C_{15-18}$ alpha-olefins; $C_{12-16}$ alpha-olefins; $C_{14-16}$ alpha-olefins; $C_{14-18}$ alpha-olefins; $C_{16-18}$ alpha-olefins; $C_{16-20}$ alpha-olefins; and $C_{22-28}$ alpha-olefins.

17. The composition of claim 1 wherein component (B) has an average of about 30 to 3500 carbon atoms.

18. The composition of claim 1 wherein component (B) has an average of about 50 to about 700 carbon atoms.

19. The composition of claim 1 wherein component (B) has a number average molecular weight in the range of about 420 to about 50,000.

20. The composition of claim 1 wherein component (B) has a weight average molecular weight in the range of about 420 to about 100,000.

21. The composition of claim 1 wherein component (B) has an inherent viscosity in the range of about 0.03 to about 1.5 deciliters per gram.

22. The composition of claim 1 wherein component (II) is a monoamine or a polyamine.

23. The composition of claim 1 wherein component (II) comprises at least one amine characterized by the presence within its structure of at least one H—N<- group.

24. The composition of claim 1 wherein component (II) is hydrazine or a substituted hydrazine.

25. The composition of claim 1 wherein component (II) has at least one primary amino group.

26. The composition of claim 1 wherein component (II) is a polyamine containing at least two H—N<- groups.

27. The composition of claim 1 wherein component (II) is a polyamine amine group containing at least two H—N21 groups, either or both of which are primary or secondary amines.

28. The composition of claim 1 wherein component (II) is a monohydric or polyhydric alcohol.

29. The composition of claim 1 wherein component (II) is an aliphatic monoamine of up to 40 carbon atoms.

30. The composition of claim 1 wherein component (II) is a cycloaliphatic monoamine.

31. The composition of claim 1 wherein component (II) is an aromatic monoamine.

32. The composition of claim 1 wherein component (II) is an aliphatic, cycloaliphatic or aromatic polyamine.

33. The composition of claim 1 wherein component (II) is a hydroxyamine.

34. The composition of claim 1 wherein component (II) is an aminosulfonic acid.

35. The composition of claim 1 wherein component (II) is a hydrocarbyl mono- or polyamine prepared by reacting a chlorinated polyolefin having a molecular weight of at least 400 with ammonia or amine.

36. The composition of claim 1 wherein component (II) is a branched polyalkylene polyamine.

37. The composition of claim 1 wherein component (II) is polyoxyalkylene diamine or polyoxyalkylene triamine, said diamine and said triamine having an average molecular weight in the range of about 200 to about 4000.

38. The composition of claim 1 wherein component (II) is an alkylene polyamine of the formula

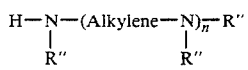

wherein n is a number from 1 to 10, each R″ is independently a hydrogen atom, a hydrocarbyl group or a hydroxy-substituted hydrocarbyl group having up to 30 carbon atoms, and the Alkylene group has from 1 to 10 carbon atoms.

39. The composition of claim 1 wherein component (II) is ethylene polyamine.

40. The composition of claim 1 wherein component (II) is a hydroxyalkyl alkylene polyamine having one or more hydroxyalkyl substituents on the nitrogen atoms.

41. The composition of claim 1 wherein component (II) is represented by the formula $R_1$—$(OH)_m$ wherein $R_1$ is monovalent or polyvalent organic radical joined to the —OH groups through carbon-to-oxygen bonds and m is an integer of from 1 to 10.

42. The composition of claim 1 wherein component (II) is a polyoxyalkylene alcohol wherein a hydroxy substituted compound, which is represented by the formula $R_2$—$(OH)_q$ (1)

wherein q is an integer of from 1 to 6 and $R_2$ is the residue of a mono- or polyhydric alcohol or mono- or polyhydroxy phenol or naphthol, is reacted with an alkylene oxide, which is represented by the formula

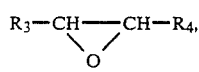 (2)

wherein $R_3$ is an alkyl group of up to four carbon atoms and $R_4$ is hydrogen or an alkyl group of up to four carbon atoms with the proviso that the alkylene oxide (2) does not contain in excess of ten carbon atoms, to form a hydrophobic base, said hydrophobic base then being reacted with ethylene oxide to provide said polyoxyalkylene alcohol.

43. The composition of claim 1 wherein component (II) is a polyoxyalkylene alcohol of up to about 150 oxyalkylene groups, the alkylene radical containing from 2 to 8 carbon atoms.

44. The composition of claim 1 wherein component (II) is represented by the formula HO—(—$R_A$O—)$_p$$R_B$—O$R_C$ wherein $R_A$ and $R_B$ are independently alkylene radicals of 2 to 8 carbon atoms, $R_C$ is aryl, lower alkyl or arylalkyl, and p is zero to eight.

45. The composition of claim 1 wherein component (II) is a monohydroxy aromatic compound or a polyhydroxy aromatic compound.

46. The composition of claim 1 wherein component (II) is a hydroxy-substituted primary amine of the formula $R_a$—$NH_2$ wherein $R_a$ is a monovalent organic radical containing at least one hydroxy group, the total number of carbon atoms in $R_a$ not exceeding about 20.

47. The composition of claim 46 wherein the total number of carbon atoms in $R_a$ does not exceed 10.

48. The composition of claim 46 wherein $R_a$ is a mono- or polyhydroxy-substituted alkyl group.

49. The composition of claim 1 wherein component (II) is selected from the group consisting of (a) primary, secondary, and tertiary alkanol amines which can be represented correspondingly by the formulae:

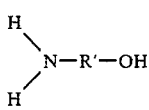

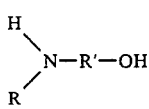

-continued
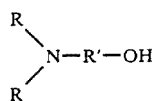
(b) hydroxyl-substituted oxyalkylene analogs of said alkanol amines represented by the formulae:
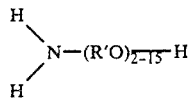
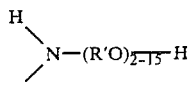
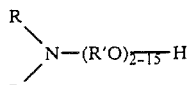
wherein each R is independently a hydrocarbyl group of one to about 8 carbon atoms or hydroxyl-substituted hydrocarbyl group of 2 to about 8 carbon atoms and R' is a divalent hydrocarbyl group of two to about 18 carbon atoms, and (c) mixtures of two or more thereof.
* * * * *